United States Patent [19]

Sackmann et al.

[11] Patent Number: 5,288,787
[45] Date of Patent: Feb. 22, 1994

[54] EMULSION POLYMERS

[75] Inventors: Günter Sackmann, Leverkusen; Wolfgang Henning, Kuerten; Joachim Probst, Leverkusen; Joachim König, Odenthal; Heinz Bäumgen, Leverkusen, all of Fed. Rep. of Germany

[73] Assignee: Bayer Aktiengesellschaft, Leverkusen, Fed. Rep. of Germany

[21] Appl. No.: 714,317

[22] Filed: Jun. 10, 1991

Related U.S. Application Data

[63] Continuation of Ser. No. 373,765, Jun. 29, 1989, abandoned.

[30] Foreign Application Priority Data

Jul. 20, 1988 [DE] Fed. Rep. of Germany ........ 3824484

[51] Int. Cl.⁵ .............................................. C08K 3/20
[52] U.S. Cl. .................................... 524/457; 525/455
[58] Field of Search ............... 524/457; 525/455; 526/260

[56] References Cited

U.S. PATENT DOCUMENTS

| | | | |
|---|---|---|---|
| 3,684,759 | 8/1972 | Reiff et al. | 524/457 |
| 4,108,814 | 8/1978 | Reiff et al | 525/460 |
| 4,616,061 | 10/1986 | Henning et al. | 524/591 |
| 4,918,129 | 4/1990 | Joachim Probst et al. | |

*Primary Examiner*—John C. Bleutge
*Assistant Examiner*—Mark D. Sweet
*Attorney, Agent, or Firm*—Sprung Horn Kramer & Woods

[57] ABSTRACT

Emulsion polymers obtainable by emulsifying a mixture consisting of

A) 5 to 95 % by weight of at least one monomer from the series consisting of acrylonitrile, methacrylonitrile, optionally substituted styrene, vinyl carboxylate and B) 5 to 95 % by weight of acrylic and/or methacrylic esters, the sum of components A)+B) being 100% by weight, in the presence of an aqueous solution or dispersion of an anionically modified polyurethane, preferably containing $-SO_3^{-Me+}$ and/or $-COO^-Me^+$ groups ($Me^+$ = cation, preferably $H^+$, $Na^+$, $K^+$, $Li^+$, $NH_4^+$ or a substituted ammonium ion), and subjecting the resulting emulsion to a polymerization initiated by free radicals.

The emulsion polymers produced are preferably used as surface sizing agents for paper.

14 Claims, No Drawings

EMULSION POLYMERS

This application is a continuation of application Ser. No. 373,765, filed Jun. 29, 1989, now abandoned.

The invention relates emulsion polymers obtainable by emulsifying a mixture consisting of A) 5 to 95% by weight of at least one monomer from the series consisting of acrylonitrile, methacrylonitrile, optionally substituted styrene, vinyl carboxylate and B) 5 to 95% by weight of acrylic and/or methacrylic esters, the sum of components A)+B) being 100% by weight, in the presence of an aqueous solution or dispersion of an anionically modified polyurethane, preferably containing $-SO_3-Me^+$ and/or $-COO^-Me^+$ groups ($Me^+$=cation, preferably $H^+$, $Na^+$, $K^+$, $Li^+$, $NH_4^+$ or a substituted ammonium ion), and subjecting the resulting emulsion to a polymerization initiated by free radicals.

The emulsion polymers produced are preferably used as surface sizing agents for paper.

It is known (see, for example, German Offenlegungsschrift 3,438,563) to produce anionic paper sizing agents in the form of aqueous polyurethane solutions or dispersions or partial dispersions. The structure of these sizing agents is such that, in addition to a hydrophobic component, hydrophilic elements are contained in the polyurethane in the form of carboxyl groups. These carboxyl groups give the polyurethane water solubility or dispersability.

Surprisingly, it has now been found that polymer emulsions can be prepared by using anionically modified polyurethanes, preferably those which contain $SO_3-Me^+$ and/or $COO^-Me^+$ groups, as polymer emulsifiers and in their presence carrying out a copolymerization of certain mixtures of monomers initiated by free radicals.

The aqueous solution or dispersion of an anionically modified polyurethane used as emulsifier is obtainable by reaction of a) organic polyisocyanates, if appropriate with the use of organic monoisocyanates with b) compounds having groups which are reactive towards isocyanate groups, if appropriate with the use of c) auxiliaries and additives and conversion of the polyisocyanate addition product produced into an aqueous solution or dispersion during or following the polyaddition reaction, in which those structural components are used as structural component b) which have anionic groups, in particular carboxylate and/or sulphonate groups or groups which can be converted into these groups, in which the at least partial conversion of the groups which can be converted into salt groups of the type mentioned is carried out during or following the polyaddition reaction and, if appropriate, with the use of structural components a) and/or b) which have ethyleneoxy units within a polyether chain, in which the total amount of these hydrophilic structural components is such that an amount of anionic groups, in particular carboxylate and/or sulphonate groups, preferably 2 to 300 milliequivalents per 100 g of solid, and, if appropriate, of ethylene oxide groups of the type mentioned, preferably 0 to 25% by weight, which guarantee water solubility or dispersibility is present in the polyisocyanate polyaddition product.

The structural components which are preferably used as structural components a) and/or b) are those containing at least portions of acylurea groups of the formula $$-NH-CO-N-CO-R, \quad (I)$$
$$|$$

in which R denotes an organic radical, preferably a saturated or unsaturated aliphatic hydrocarbon radical having 1 to 35 C atoms, an aryl radical having 6 to 10 C atoms or an araliphatic radical having 7 to 10 C atoms, in which different radical R can be present, if several radicals R are present in the same molecule side by side.

Preferably, the total amount of the structural units of the formula (I) incorporated is such that the polyisocyanate addition product contains 0.1 to 20% by weight, relative to the solid, of acylated urea groups of the formula $$-NH-CO-N-CO-$$
$$|$$

The water-soluble or water-dispersable anionic polyurethane compounds which are used as polymer emulsifiers are prepared by known processes, such as are described, for example, in German Offenlegungsschrift 3,630,045 and the literature references cited therein. The particularly preferred polyisocyanate polyaddition products which contain acylurea groups are prepared by processes such as are described, for example, in German Offenlegungsschrift 3,438,563=U.S. Pat. No. 4,616,061.

For the preparation of the emulsifiers used according to the invention, a) organic polyisocyanates, if appropriate with the use of monofunctional isocyanates, b) compounds containing at least two groups which are reactive towards isocyanate groups, if appropriate with the use of suitable monofunctional compounds, and, if appropriate, c) further auxiliaries and additives are used.

Examples of suitable structural components a) are:

a1) diisocyanates of the formula $Q(NCO)_2$ in which Q denotes an aliphatic hydrocarbon radical having 4 to 12 carbon atoms, a cycloaliphatic hydrocarbon radical having 6 to 15 carbon atoms, an aromatic hydrocarbon radical having 6 to 15 carbon atoms or an araliphatic hydrocarbon radical having 7 to 15 carbon atoms. Examples of these preferably used diisocyanates are tetramethylene diisocyanate, hexamethylene diisocyanate, dodecamethylene diisocyanate, 1,4-diisocyanatocyclohexane, 1-isocyanato-3,3,5-trimethyl-5-isocyanatomethylcyclohexane, 4-4'-diisocyanatodicyclohexylmethane, 4,4'-diisocyanato-2,2-dicyclohexylpropane, 1,4-diisocyanatobenzene, 2,4-diisocyanatotoluene, 2,6-diisocyanatotoluene, 4,4'-diisocyanatodiphenylmethane, 4,4'-diisocyanato-2,2-diphenylpropane, p-xylylene diisocyanato or $\alpha,\alpha,\alpha',\alpha'$-tetramethyl-m- or p-xylylene diisocyanate, and mixtures consisting of these compounds.

The structural components a) also include the following examples:

a2) the prepolymers known per se from polyurethane chemistry and containing NCO groups, such as can be obtained by reaction of simple diisocyanates of the type mentioned in a1) by way of example with organic polyhydroxyl compounds of the type mentioned below in b1) by way of example, while maintaining an NCO/OH equivalent ratio of, for example, 1.2:0 to 10:1, preferably 1.5:1 to 2.5:1. As shown by the equivalent ratio mentioned, "NCO prepolymers" in the context of the invention are also understood to mean the so-called "semi-prepolymers", that is, mixtures of excess unconverted diisocyanates with true NCO prepolymers.

The structural components a) additionally include, for example, a3) polyisocyanates containing acylurea groups of the general formula

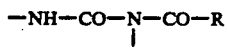

In this formula, R has the meaning already mentioned above.

It is in general possible to use as component a3) polyisocyanates which contain several of these acylurea groups, in which the individual radicals R are as defined above but can be different from one another.

The polyisocyanates a3) which contain acylurea groups can be either comparatively low-molecular-weight or high-molecular-weight NCO prepolymers. The preparation of the structural components a3) is carried out analogously to the teaching of U.S. Pat. No. 4,077,989 by partial carbodiimidization of the isocyanate groups of organic polyisocyanates of the type mentioned above in a1) and a2) by way of examples followed by an addition reaction of carbodiimide-modified polyisocyanates thus prepared with organic carboxylic acids R—COOH. Typical examples of suitable structural components a3) are, for example, diisocyanates of the general formula

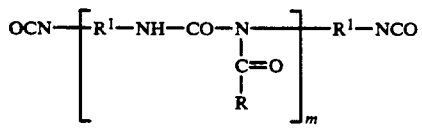

which are prepared in such a manner that in a first step carbodiimide groups of diisocyanatocarbodiimides of the general formula

are completely or partially reacted with carboxylic acids of the general formula

in the presence or absence of a suitable solvent at temperatures from 25° to 100° C.

In these formulae,

R represents a radical of the type already mentioned above in the definition of R, $R^1$ represents a divalent hydrocarbon radical, optionally containing urethane, ester and/or ether groups, such as is obtained by removal of the terminal isocyanate groups from a simple organic diisocyanate or an NCO prepolymer which contains urethane groups and, if appropriate, ether or ester groups, in which, if several radicals $R^1$ are present in the same molecule, different radicals $R^1$ which conform to the definition mentioned can also be present at the same time, and m represents a whole or (on average) fractional number from 1 to 10, preferably from 1 to 4.

The preparation of the diisocyanatocarbodiimides is known per se and is described, for example, in U.S. Pat. No. 2,840,589 and 2,941,966 and by P. W. Campbell and K. C. Smeltz in Journal of Organic Chemistry, 28, 2069 (1963). Diisocyanatocarbodiimides can also be prepared under particularly mild conditions and free of by-products by heterogeneous catalysis according to U.S. Pat. No. 4,294,719 and 4,344,855. The carbodiimidization of diisocyanates in the presence of very small amounts of phospholine oxide followed by blocking of the catalyst with acid chlorides is described in U.S. Pat. No. 4,223,113 and 4,223,125.

Aromatic diisocyanates of the type mentioned above in a1) by way of example are preferably used as structural component for the diisocyanate containing carbodiimide groups.

Examples of suitable carboxylic acids of the formula R—COOH are acetic acid, propionic acid, hexanoic acid, lauric acid, palmitic acid, stearic acid, benzoic acid, phenylacetic acid, acrylic acid, methacrylic acid, crotonic acid, 10-undecenecarboxylic acid, oleic acid or linolic acid. In general it is also possible to use other monocarboxylic acids which do not conform to the definition of R given above, such as, for example, chloroacetic acid, cyclohexane carboxylic acid, abietic acid, 4-dimethylaminobenzoic acid or even monoesters or monoamides or dicarboxylic acids such as oxalic acid, malonic acid, succinic acid, maleic acid, fumaric acid or phthalic acid with monohydric alcohols or amines. In general any desired mixtures of the acids of the general formula R—COOH mentioned by way of examples can also be used. The amount of the acids used is such that 0.2 to 1.2, preferably 0.5 to 1.2 mol of carboxyl groups per mol of carbodiimide groups are present in the reaction mixture.

The preparation of the NCO prepolymers, which are also suitable as structural component a3) containing acylurea groups, can be carried out, for example, either by reaction of the already mentioned polyisocyanates, which contain acylurea groups and are based on low-molecular weight diisocyanates, with less than equivalent amounts of polyhydroxyl compounds of the type mentioned below in b1) and/or b2) by way of example or by partial carbodiimidization of NCO prepolymers of the type mentioned above in a2) by way of example, followed by reaction of the carbodiimidization products with carboxylic acids R—COOH analogously to details given above.

Other examples of further possible structural components a) are a4) hydrophilically modified polyisocyanates, for example diisocyanates containing pendant polyether chains with incorporated ethylene oxide units according to U.S. Pat. No. 3,920,598 or sulphonated diisocyanate of the type mentioned, for example, in German Offenlegungsschrift 2,227,111 or U.S. Pat. No. 3,959,329. However, the use of these hydrophilically modified polyisocyanates is less preferred, since the hydrophilic groups are preferably incorporated via structural component b) described below in more detail.

In general it is also possible to use structural components a1) to a4) mentioned by way of example in combination with higher-functional low-molecular-weight polyisocyanates such as, for example, the reaction product from 3 mol of 2,4-diisocyanatotoluene with one mole of trimethylolpropane and/or in combination with monofunctional isocyanates such as phenyl isocyanate, hexyl isocyanate or n-dodecyl isocyanate. The use of monofunctional isocyanates containing polyether chains with incorporated ethylene oxide units of the type mentioned, for example, in U.S. Pat. No. 3,920,598 and 4,237,267 is usually also possible. However, when this type of monofunctional isocyanate is used, it is in general necessary to prevent premature chain termination, in particular if high-molecular-weight polyurethanes are prepared, by the simultaneously use of higher than difunctional structural components. Preferably, difunctional isocyanates of the type mentioned above by way of example are used as structural component a).

Examples of suitable structural components b) are b1) the polyhydroxy polyesters or polyethers known from polyurethane chemistry of the molecular weight range 400 to 4000, preferably the corresponding difunctional compounds such as are available in a manner known per se by reaction of polybasic acids, in particular difunctional acids, such as, for example, adipic acid, phthalic acid, tetrahydrophthalic acid and/or hexahydrophthalic acid, with excess amounts of polyhydric alcohols, preferably dihydric alcohols of the type mentioned below in b2) by way of example, or by alkoxylation of suitable initiator molecules, such as, for example, water, ammonia, aniline or the polyhydric alcohols mentioned below in b2) by way of example with alkylene oxides, such as, for example, ethylene oxide and/or propylene oxide.

Other examples of suitable structural components b) are b2) polyhydric alcohols, in particular dihydric alcohols of the molecular weight range 62 to 399, in particular the corresponding alkane polyols, such as, for example, ethylene glycol, propylene glycol, tetramethylenediol, hexamethylenediol, glycerol, trimethylolpropane or trimethylolethane or even low-molecular-weight alcohols which contain ether groups, such as, for example, diethylene glycol, triethylene glycol, dipropylene glycol or tripropylene glycol. Any desired mixtures of these alcohols can also be used.

Other examples of suitable structural components b) are b3) compounds containing at least two amino or hydrazine amino groups of the molecular weight range 32 to 400, such as, for example, ethylenediamine, hexamethylenediamine, isophoronediamine, 2,4-diaminotoluene, 4,4'-diaminodiphenylmethane, 4,4'-diaminodicyclohexylmethane, diethylenetriamine, triethylenetetramine, hydrazine or hydrazine hydrate. These structural components can also be used in blocked form, that is to say, in particular in the form of the corresponding ketimines or ketazines (reaction products with simple ketones such as acetone, methyl ethyl ketone or methyl isobutyl ketone). When this type of blocked chain-lengthening agent is used, the groups which are reactive with isocyanate groups are only set free under the hydrolytic effect of the dispersing water.

Further examples of compounds which are suitable as structural component b) are b4) ionic structural components or potentially ionic structural components which in general have a molecular weight of 60 to 400, preferably 89 to 400, and which, in addition to at least one group which is reactive towards isocyanate groups, have at least one carboxylate and/or sulphonate group or a group which can be converted into such a group. These include, for example, the aliphatic diols containing sulphonate groups according to U.S. Pat. No. 4,108,814 or 4,056,564, the diols containing carboxylate groups or carboxyl groups which can be converted into carboxylate groups and/or diaminosulphonates of the type described in Canadian Patent Specification 928,323, such as, for example, the sodium salt of N-(2-aminoethyl)-2-aminoethanesulphonic acid.

The particularly preferred ionic structural components b4) include sulphonatediols of the general formula

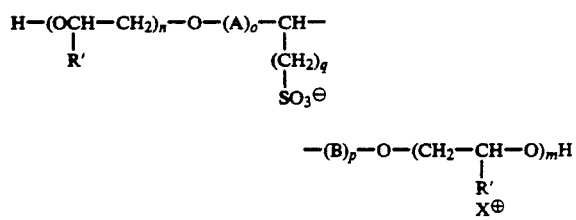

in which

A and B represent identical or different divalent aliphatic hydrocarbon radicals having 1 to 6 carbon atoms, R' represents hydrogen, an aliphatic hydrocarbon radical having 1 to 4 carbon atoms or a phenyl radical, $X^\oplus$ represents an alkali metal cation or a substituted or unsubstituted ammonium group, n and m represent identical or different numbers from 0 to 30, o and p each represent 0 or 1 and q represents an integer from 0 to 2.

The preferred structural components b4) which contain carboxylate groups or groups which can be converted into carboxylate groups include hydroxycarboxylic acids of the general formula $$(HO)_x-Q(COOH)_q$$

in which

Q represents a linear or branched hydrocarbon radical having 1 to 12 carbon atoms and x and y each represent integers from 1 to 3, the sum x+y adding up to a value from 2 to 4.

The particularly preferred structural components b4) of the last-mentioned formula include those acids in which x represents 2 and y represents 1, such as are described by way of example in U.S. Pat. No. 3,412,054. α,α-Dimethylolpropionic acid or the salts with tertiary amines, such as, for example, trimethylamine, triethylamine, N-methylmorpholine, N-ethylmorpholine, N-methylpiperazine, N,N-dimethylethanolamine or N-methyldiethanolamine are the very particularly preferred structural components b4) of the last-mentioned general formula.

In all variations of the process, the amount of the structural component which contains sulphonate and/or carboxylate groups or groups which can be converted into these groups is chosen such that in the process products according to the invention 2 to 300, preferably 10 to 300, milliequivalents are present per 100 g of solid.

Further examples of compounds which are also suitable according to the invention as structural component b) are b5) monohydric or dihydric alcohols containing ethyleneoxide units incorporated in the polyether chains. These include, for example, compounds of the general formula

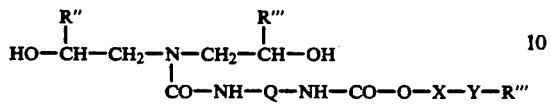

in which

Q represents a divalent radical, such as is obtainable by removal of the isocyanate groups from a diisocyanate of the formula $Q(NCO)_2$ of the type mentioned above in a1), R" represents hydrogen or a monovalent hydrocarbon radical having 1 to 8 carbon atoms, preferably it represents hydrogen or a methyl group, R''' represents a monovalent hydrocarbon radical having 1 to 12 carbon atoms, preferably it represents an unsubstituted alkyl radical having 1 to 4 carbon atoms, X represents a radical such as is obtained by removal of the terminal oxygen atom from a polyalkylene oxide chain having 5 to 90, preferably 20 to 70, chain members, at least 40% of which, preferably at least 65%, consist of ethylene oxide units and which, in addition to ethylene oxide units, can also represent propylene oxide, butylene oxide or styrene oxide units, of the last-mentioned units propylene oxide units being preferred, and Y represents oxygen or $-NR^{iv}-$, in which $R^{iv}$ corresponds in its definition to R'''.

The preparation of the compounds of the last-mentioned formulae can be carried out by the procedures of U.S. Pat. No. 3,905,929 or U.S. Pat. No. 4,190,566.

Other preferred hydrophilic structural components b5) are compounds of the general formula

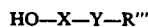

in which X, Y and R''' have the already mentioned meaning.

If these monofunctional nonionic hydrophilic polyethers are used, it is often advantageous to prevent a premature chain termination by the use of more than difunctional structural components. The monofunctional polyethers of the last-mentioned general formula are prepared by processes known per se, such as are described, for example, in U.S. Pat. Nos. 3,905,929, 4,190,566 or 4,237,264.

Other suitable structural components b) are b6) aminoalcohols of the molecular weight range 61 to 300 which do not have tertiary nitrogen, such as, for example, ethanolamine, propanolamine, diethanolamine or dipropanolamine.

Other suitable structural components b) are b7) polyhydric, preferably dihydric, alcohols which contain acylurea groups, such as are obtainable, for example, by reaction of the diisocyanates which contain acylurea groups and have been mentioned in a3) by way of example, in particular those based on low-molecular-weight starting diisocyanates, with the compounds mentioned in b1), b2) and/or b6) by way of example, while maintaining an OH/NCO ratio of 1.2:1 to 30:1, or, if aminoalcohols b6) are used, an $NH_2/NCO$ ratio of 0.6:1 to 1.2:1 or, preferably by reaction of the polyisocyanates which contain carbodiimide groups and have been mentioned in the discussion of component a3), preferably diisocyanates based on low-molecular-weight starting isocyanates, with the polyhydroxyl compounds mentioned, while maintaining an OH/NCO equivalent ratio of 1.2:1 to 30:1, or, if aminoalcohols b6) are used, an $NH_2/NCO$ ratio of 0.6:1 to 1.2:1, followed by reaction of the reaction product with carboxylic acids R—COOH in accordance with the details given above. In the case where hydroxyl-containing starting materials b1 and/or b2 are used, the reaction of the polyhydroxyl component with the isocyanate component is in each case preferably carried out, while maintaining an OH/NCO equivalent ratio of 1.5:1 to 15:1 and in particular 1.5:1 to 3:1. The preparation of the hydroxyl-containing structural components b7) or the intermediates used for their preparation and containing carbodiimide groups is in general carried out in the temperature range from 25° to 130° C., preferably from 50° to 120° C., in the presence or absence of an inert solvent of the type mentioned in U.S. Pat. No. 4.172,936 and 4,192,926 or way of example. As to the other details of the preparation of these polyhydroxyl compounds which contain acylurea groups, reference is made to this previous publication.

Finally, a further suitable structural component b) is b8) water which can adopt the double function of acting as the continuous phase of the dispersion according to the invention on the one hand and as a chain-lengthening agent on the other. Preferably, difunctional structural components b) are used to effect the isocyanate addition reaction. However, as already discussed, it is also possible to use monofunctional structural components b), in particular of the type mentioned in b4) or b5), or, in order to achieve branching in the molecule, which may be desired, higher than difunctional structural components b).

Examples of the auxiliaries and additives c) to be used, if desired, include c1) solvents which are used, if desired, for the synthesis of the polyurethanes. Suitable solvents are, for example, toluene, xylene, acetone, methylglycol acetate, ethylglycol acetate, propylene glycol monomethyl ether acetate, butyl acetate, N-methylpyrrolidone, ethyl acetate or methyl ethyl ketone. Preferably, water-miscible solvents such as acetone or N-methylpyrrolidone are used.

Further examples of auxiliaries and additives c) to be used, if desired, are c2) on the one hand, compounds which react with isocyanate groups with the formation of acylated amino groups and, on the other, compounds which are capable of reacting with these acylated amino groups in a condensation reaction. The first-mentioned compounds include, for example, ammonia or urea and the last-mentioned compounds include, for example, any desired aldehydes, in particular formaldehyde.

Further examples of auxiliaries and additives c) to be used, if desired, are c3) any desired accelerators for the isocyanate polyaddition reaction known per se from polyurethane chemistry. However, in general the use of these catalysts is not required.

The preparation of the emulsifiers used according to the invention can be carried out by any desired methods of the prior art, such as are described, for example, in U.S. Pat. No. 4,670,100.

Preferably, the polymerization of the mixtures of monomers consisting of A) and B) is carried out in the presence of 10 to 70% by weight of the anionically modified polyurethane, relative to the mixture of monomers.

Particularly preferably, the weight ratio between the anionically modified polyurethane and the mixture of monomers consisting of A) and B) is 1:4 to 1:1.

Preferably, the emulsion polymers according to the invention are obtained as a colloid disperse solution having an average particle diameter of preferably about 15 to about 200 nm, particularly preferably 20–150 nm.

For the purpose of emulsification, it is in general sufficient using the anionic polyurethane compound without any further additives for the emulsion polymerization. However, in some cases, it turns out to be quite favourable, if oligomeric nonionic and/or low-molecular-weight anionic auxiliary emulsifiers, preferably in relative amounts of 1 to 40% by weight, particularly preferably 3 to 20% by weight, based on the anionic polyurethane emulsifier, are used together with the polymeric anionic emulsifier.

Suitable nonionic auxiliary emulsifiers are reaction products of aliphatic, araliphatic, cycloaliphatic or aromatic carboxylic acids, alcohols, phenol derivatives or amines with epoxides, such as, for example, ethylene oxide.

Examples of these are reaction products of ethylene oxide with carboxylic acids, such as, for example, lauric acid, stearic acid, oleic acid, carboxylic acids of castor oil, abietic acid, with longer-chain alcohols, such as, oleyl alcohol, lauryl alcohol, stearyl alcohol, with phenol derivatives, such as, for example, substituted benzylphenols, phenylphenols, nonylphenol and with longer-chain amines, such as, for example, dodecylamine and stearylamine. The reaction products with ethylene oxide are oligomeric ethers or polyethers having polymerization degrees between 2 and 100, preferably 5 to 50.

Preferred nonionic emulsifiers conform to the formula

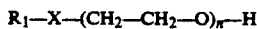

in which
X denotes O, NH or COO,
$R_1$ denotes an aliphatic, cycloaliphatic, araliphatic or aromatic hydrocarbon radical having 6–30 C atoms and
n is an integer $\geq 2$.

Preferred emulsion polymers according to the invention are obtainable by using a mixture of 20 to 80% by weight of A) and 80 to 20% by weight of B), particularly preferably 30 to 70% by weight of A) and 70 to 30% by weight of B) and very particularly preferably about 50% by weight of A) and about 50% by weight of B).

Examples of suitable monomers A) are: acrylonitrile, methacrylonitrile, styrene, α-methylstyrene, p-methylstyrene, p-ethylstyrene, p-chlorostyrene, vinyl esters of aliphatic $C_2$–$C_6$-carboxylic acids, for example vinyl acetate and vinyl propionate.

Examples of suitable monomers B) are: (meth)acrylic esters having 1 to 12 C atoms in the alcohol radical, such as ethyl acrylate, methyl methacrylate, n-butyl acrylate, i-butyl acrylate, 2-ethylhexyl acrylate, 2-hydroxyethyl acrylate, 3-hydroxypropyl methacrylate, n-butyl acrylate.

Styrene and acrylonitrile are preferably used so that, for example, a copolymer consisting of 20 to 80, in particular 30 to 70%, by weight of n-butyl acrylate and 80 to 20, in particular 70 to 30%, by weight of acrylonitrile is of particular importance.

$Me^+$ denoting a substituted ammonium ion preferably represents

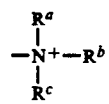

in which $R^a$, $R^b$, $R^c$ signify hydrogen, $C_1$–$C_6$-alkyl, phenyl, benzyl, and at least one of these substituents is H.

The radical-initiated emulsion polymerization of the abovementioned monomers in the presence of the anionically modified polyurethane solutions, which can act as polymer emulsifiers or graft substrates, is carried out in the usual manner. For example, the procedure can be such as described below:

A copolymerization initiated by radical starters of the mixtures of monomers in the presence of aqueous solutions of the abovementioned polymer emulsifiers is carried out. Examples of suitable initiators are potassium persulphate, ammonium persulphate, organic peroxides, organic hydroperoxides, hydrogen peroxide and redox systems. The emulsion polymerizations are in general carried out at temperatures between 20° and 100° C., preferably between 40° and 80° C. The amount of the polymer emulsifiers, relative to the monomers to be polymerized, is preferably 5 to 50% by weight, particularly preferably between 7.5 and 30% by weight.

The emulsion polymerizations are carried out either such that an aqueous solution of the polymer emulsifiers is initially introduced and the monomers and the initiator are then metered in separately over a certain period of time, for example between 2 and 6 hours, or alternatively, that a portion of the polymer emulsifier in water is initially introduced and the remainder together with the monomers, on the one hand, and the initiator, on the other, are metered in separate feed streams, likewise over a period of 2 to 6 hours. However, the procedure can also be such that over the entire period of the polymerization the polymer emulsifier, initiator and monomers are metered in separately and continuously and only a certain amount of water is initially introduced. However, this type of polymerization is also suitable for a batchwise procedure, that is, polymer emulsifier, mixture of monomers and initiator are initially introduced, the mixture is heated to the desired polymerization temperature and maintained at this temperature for 2 to 10 hours.

After the polymerization reaction is completed in the manner described by way of example, a finely divided aqueous polymer emulsion having an average particle diameter of between 20 and 200 nm, preferably between 30 and 150 nm, which is measured by laser scattered light spectroscopy, has been formed. Dispersions having particle sizes of less than 50 nm appear transparent, while those having larger particles appear cloudy. In addition to homopolymers and/or copolymers of the monomers or mixtures of monomers used for the polymerization, the emulsion also contains portions of graft products of the monomers, which are grafted onto the polymer emulsifiers as graft substrates. These graft reactions, which are initiated by transfer reactions of the emulsifier, are known in the literature (cf. H. Gerrens, Fortschritte der Hochpolymer-Forschung, vol. I, (1959), p. 300).

If desired, the aqueous polymer emulsions can be worked up in the usual manner to obtain the solid polymers.

Suitable initiators for the emulsion polymerization are preferably water-soluble, radical-producing, nonionic peroxides, such as hydrogen peroxide and t-butyl hydroperoxide and water-soluble azo compounds, such as are described, for example, in German Offenlegungsschrift 2,841,045. Redox systems which consist of peroxide initiators and reducing agents, such as amines, polyamines, thiourea, iron(II) salts and the like are also suitable. Suitable initiators are also water-insoluble initiators, such as azoisobutyronitile and benzoyl peroxide. The latter are virtually only dissolved in the organic phase. The initiators mentioned are added in amounts from 0.1 to 5% by weight, preferably 0.3 to 3.0% by weight, relative to the mixture of monomers.

To regulate the molecular weight of the polymers, conventional regulators can additionally be used, for example n-dodecyl mercaptan, t-dodecyl mercaptan, diisopropyl xanthogen disulphide, thioglycol and thioglycerol. The amounts added are 0.1 to 2% by weight, relative to the mixture of monomers.

The emulsion polymers according to the invention can be used, for example, as film-forming materials or as sizing agents for fibres, in particular glass fibres. However, they are preferably used in the form of aqueous emulsions (which are formed during their preparation) for surface-sizing of paper or paper-like materials, such as cardboard or paperboard. They are surface-sizing agents having a weakly anionic character and a broad range of application. Thus, they can be used during paper production even in the acidic or in the neutral pH range.

In the case of alum-containing, alum-free, presized and wood-containing papers, which can contain various fillers, such as kaolin, chalk or $TiO_2$, they give an excellent sizing effect. A particularly prominent characteristic of these novel emulsion polymers is the fact that they can be used in the sizing liquor without the extensive foam formation which is usually often observed with sizing agents.

The surface-sizing agents can be employed by any methods which are customary in paper production for surface-sizing, such as use in the sizing press or application by spraying processes. They can be used either alone or in combination with aqueous solutions of polymers. Foam-promoting influences, such as, for example, unfavourable apparative conditions at the paper machine or the sizing press, foam-forming additives in the sizing agent liquor and high degrees of hardness of the water used for the paper production have no effect on the products according to the invention. Thus, in addition to the good sizing effect, their nonexistent tendency for foam formation represents a further advantage, since they can be used in the complete absence of any antifoams.

The sizing agents can be used for the surface-sizing of almost all paper grades produced in practice, for example alum-containing, alum-free papers, those filled with kaolin, those filled with chalk, those filled with $TiO_2$, those processed in a neutral and acidic pH, unsized, presized, wood-containing papers and those containing recycled papers either alone or in combination with those sizing agents which are added to the pulp.

The novel sizing agents are particularly distinguished by the fact that they have a much wider range of application compared with the sizing agents which have a high anionic character. While the latter only have a good sizing effect on alum-containing, presized and wood-containing papers, the products according to the invention have excellent sizing properties in addition to the papers mentioned also on alum-free and chalk-containing papers. To achieve a good sizing effect on the two last-mentioned papers, the use of surface-sizing agents having a cationic charge has previously always been necessary.

EXAMPLES

Preparation of the Polymer Emulsifiers

Example 1 (Emulsifier A)

0.4 part of a mixture of 1-methyl-1-phospha-2-cyclopentene 1-oxide and 1-methyl-1-phospha-3-cyclopentene 1-oxide is added to 130.5 parts (0.75 mole) of a mixture of 2,4-toluylene diisocyanate and 2,6-toluylene diisocyanate in a ratio of 65:35 at room temperature, and the mixture is heated to 60° C. The degree of carbodiimidization can be monitored by the evolution of $CO_2$ and the decrease in the NCO value. At an NCO content of 20.0%, the mixture is cooled to 60° C., and the reaction is stopped with 0.2 part of phosphorus trichloride. After a further 30 minutes a constant NCO value is obtained.

Analysis of the reaction product:

NCO value: 19.4%

NCN units per molecule (average value): 1.98

The reaction product is dissolved in 75 parts of acetone and reacted at 80° C. with 54 parts (0.1255 mole) of a propoxylated adduct obtained from 2-butene-1,4-diol and $NaHSO_3$ (MW=430) over a period of 90 minutes.

The reaction product is then cooled to 60° C., 95 parts (0.333 mole) of stearic acid are added, the mixture is stirred at 60° C. for 30 minutes and then diluted with 300 parts of acetone. It is again heated to 60° C., 26.4 parts (0.251 mole) of diethanolamine are added, and the mixture is stirred for 30 minutes. 25.1 parts (0.251 mole) of succinic anhydride are then added and reacted. After 60 minutes, salt formation is carried out with 25.4 parts of triethylamine (0.251 mole) and, after a further 30 minutes, the product is dispersed in 780 parts of water.

This gives a clear solution having a solids content of 30% by weight and a pH of 6. The dissolved solid has a sulphonate group content of 37.5 milliequivalents per 100 g and a carboxylate group content of 75.2 milliequivalents per 100 g and an acylated urea group content

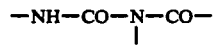

of 8.5%.

Example 2 (Emulsifier B)

0.04 part of a mixture of 1-methyl-1-phospha-2-cyclopentene 1-oxide and 1-methyl-1-phospha-3-cyclopentene 1-oxide is added to 130.5 parts (0.75 mole) of a mixture of 2,4-toluylene diisocyanate and 2,6-toluylene diisocyanate in a ratio of 65:35 at room temperature, and the mixture is heated to 60° C. The degree of carbodiimidization can be monitored by the evolution of $CO_2$ and the decrease in the NCO value. At an NCO content of 20.0%, the mixture is cooled to 60° C., and the reaction is stopped with 0.2 part of phosphorus trichloride. After a further 30 minutes, a constant NCO value is obtained.

Analysis of the reaction product:
NCO value: 18.9%
NCN units per molecule (average value): 2.0 g The reaction product is dissolved in 75 parts of acetone and reacted at 80° C. with 52 parts (0.1214 mole) of a propoxylated adduct obtained from 2-butene-1,4-diol and $NaHSO_3$ (MW=430) over a period of 90 minutes.

The reaction product is then cooled to 60° C., 96 parts (0.338 mole) of stearic acid are added, the mixture is stirred at 60° C. for 30 minutes and then diluted with 300 parts of acetone. It is again heated to 60° C., 25.4 parts (0.251 mole) of diethanolamine are added, 48.6 parts (0.486 mole) of succinic anhydride are then added and reacted. After 60 minutes, salt formation is carried out with 49.0 parts of triethylamine (0.486 mole) and, after a further 30 minutes, the product is dispersed in 880 parts of water.

This gives a clear solution having a solids content of 29% by weight and a pH of 6. The dissolved solid has a sulphonate group content of 32 milliequivalents per 100 g and a carboxylate group content of 128 milliequivalents per 100 g and an acylated urea group content

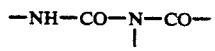

of 7.15%.

PREPARATION OF THE SIZING AGENT EMULSIONS

Sizing Agent I

In a stirred vessel equipped with stirrer, reflux condenser and two dropping funnels, a solution of 51.7 g of the polymer emulsifier A (solids content: 29%) in 545 g of deionized water is initially introduced, while passing a nitrogen stream through the vessel, and the mixture is heated to a temperature of 65° C.

¼ each of solutions I and II (see below) are added to the stirred vessel all at once, the mixture is stirred at 65° C. for one hour, and the remainder of solutions I and II is metered in over a period of 3 hours. After the addition is completed, stirring at 70° C. is continued for 2 hours and stirring at 80° C. for 3 hours.

After the polymerization is completed, a finely divided sizing agent emulsion having a solids content of 14% by weight has been formed. The average particle size determined by laser light scattering is 90 nm.

| Solution I: | 800 mg of potassium persulphate |
| --- | --- |
| | 70 g of deionized water |
| Solution II: | 50 g of n-butyl acrylate |
| | 50 g of acrylonitrile |

Sizing Agent Emulsion II

A solution of 200 mg of potassium persulphate in 17.5 g of water and 12.5 g of n-butyl acrylate and 12.5 g of acrylonitrile are added to a solution of 25.9 g of emulsifier B (solids content 29%) in 521 g of deionized water under a nitrogen atmosphere, and the mixture is heated with stirring to a temperature of 65° C.

After one hour at this temperature solutions I and II are metered in over a period of 3 hours.

| Solution I: | 600 mg of potassium persulphate |
| --- | --- |
| | 62.5 g of deionized water |
| Solution II: | 37.5 g of n-butyl acrylate |
| | 37.5 g of acrylonitrile |

After the metering in is completed, stirring at 70° C. is continued for 25 hours and stirring at 80° C. for 3 hours.

The resulting finely divided emulsion has a solids content of 14.1% and has an average particle size of 105 nm.

Sizing Agent Emulsion III

In a 1 l stirred vessel equipped with stirrer, reflux condenser, nitrogen inlet and two dropping funnels, 68.9 g of a 2 g % strength solution of the polymer emulsifier A, 560 g of deionized water and 270 mg of Rongalite C are initially introduced, while passing a weak nitrogen stream through the vessel. The solution is heated to 50° C., and ¼ each of solutions I and II is added all at once. After stirring for one hour, the remainder of these solutions I and II are metered in separately over a period of 3 hours.

After the addition is completed, stirring at 50° C. is continued for 6 hours. The resulting finely divided sizing agent emulsion has a solids content of 14.1% and an average particle size of 59 nm.

| Solution I: | 800 mg of ammonium persulphate |
| --- | --- |
| | 70 g of deionized water |
| Solution II: | 50 g of n-butyl acrylate |
| | 50 g of acrylonitrile |

All three sizing agent emulsions I to III can be used directly as such for surface-sizing of paper.

WORKING EXAMPLES

The sizing effect of the sizing agents according to the invention was tested on alum-free and alum-containing papers of the following composition:
a) alum-free paper: 50% of softwood cellulose, 50% of hardwood cellulose, 9.5% of clay ash, pH in the head box: 7.2; degree of fineness: 35°SR; wet pick-up in a laboratory sizing press: about 85%; paper weight 80 g/m².
b) Alum-containing paper: 50% of softwood cellulose, 50% of hardwood cellulose, 1% of alum, 11.2% of clay ash, pH in the head box: 5.0; degree of fineness: 35°SR; wet pick-up: about 80%; paper weight: 80 g/m².

The sizing of the papers was carried out on a laboratory sizing press from Mathis, Zürich, Switzerland, Type HF. The sizing liquor used was a solution of 5 parts by weight of commercially available starch and also 0.15, 0.20, 0.26, 0.32 and 0.40 part of the sizing agent to be tested, which was made up to 100 parts with water. The drying of the surface-size papers was carried out on a drying cylinder over a period of one minute at about 100° C. Before the sizing test, the papers were conditioned at room temperature for 2 hours.

To evaluate the degree of sizing of the surface-size papers, the Cobb values (according to DIN 53,132) were determined and also ink flotation tests (IFT) were carried out. For the ink floatation tests, the papers were cut into strips, 3 cm wide and 3 cm long, and placed at 22° C. on blue test ink (DIN 53,126). After the tests whose times were different for the individual types of paper, the test papers were removed from the ink, squeezed off with the rear side on blotting paper and evaluated visually after 5 minutes. To determine the ink penetration through the paper and thus the degree of sizing qualitatively, an evaluation using the numbers 1 to 5 was carried out, the individual numbers denoting:
1—no ink penetration
2—5 to 10% of ink penetration
3—10 to 20% of ink penetration
4—about 50% of ink penetration
4,5*,—about 90% of ink penetration
5—100% of ink penetration

*.In addition, further intermediate values can additionally be used.

The tables which follow show the effectiveness of the paper surface-sizing agents A–F according to the invention on various types of paper.

In working examples 1 to 3, alum-free and alum-containing paper were surface-sized with 0.2% each of sizing agents I to III. The results measured in these practical applications are summarized in Tables 1 to 3.

Working Example 1: Sizing agent I

TABLE 1

| Type of paper | Cobb value (60") [g/m²] | IFT Time (min.) | Eval. |
|---|---|---|---|
| Alum-free | 31.0 | 6 | 3 |
| Alum-containing | 26.6 | 10 | 2.5 |

Working Example 2: Sizing agent II

TABLE 2

| Type of paper | Cobb value (60") [g/m²] | IFT Time (min.) | Eval. |
|---|---|---|---|
| Alum-free | 28.6 | 15 | 3.0 |
| Alum-containing | 27.8 | 15 | 3.0 |

Working Example 3: Sizing agent III

TABLE 3

| Type of paper | Cobb value (60") [g/m²] | IFT Time (min.) | Eval. |
|---|---|---|---|
| Alum-free | 28.5 | 5 | 2.5 |
| Alum-containing | 23.2 | 7 | 3 |

Working Example 4

Using the example of sizing agents I to III, the foaming behaviour of the surface-sizing agents according to the invention is described.

0.4% by weight of active substance is dissolved in a sizing liquor of 5% by weight of commercially available starch (Perfectamyl A 4652®), and the mixture is heated to 60° C. 200 ml of this sizing liquor are passed from an aluminium vessel containing a circular opening, 4 mm in diameter, (Ford cup) at its bottom from a height of 60 cm into a graduated beaker by free fall. The volume in ml of the foam forming above the surface of the liquid is determined once immediately and then after standing in air for 1 minute.

The first value gives information about the tendency of the sizing agent to foam and the second value about the rate of defoaming or about its stability. The test results obtained using the surface-sizing agents are summarized in Table 4:

TABLE 4

| Sizing agents | Foam volume in ml | |
|---|---|---|
| | immediately | after 1 min. |
| I | 50 | 0 |
| II | 10 | 0 |
| III | 80 | 20 |

The results found clearly show that the products tested have only a very slight tendency to foam (sizing agent III) or even virtually none at all (sizing agents I and II).

We claim:

1. Emulsion polymers obtained by emulsifying a mixture consisting of
    A) 5 to 95% by weight of at least one monomer from the group consisting of acrylonitrile, methacrylonitrile and vinylcarboxylate, and
    B) 5 to 95% by weight of acrylic esters, methacrylic esters, or mixtures thereof, the sum of components A)+B) being 100% by weight, in the presence of an aqueous solution or dispersion of an anionically modified polyurethane based on a) diisocyanates of the formula

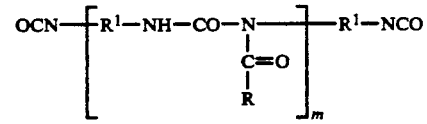

wherein

R denotes a saturated or unsaturated aliphatic hydrocarbon radical having 1 to 35 C atoms, an aryl radical having 6 to 10 C atoms, or an araliphatic radical having 7 to 10 C atoms, in which different radicals R can be present if several radicals R are present in the same molecule side by side, $R^1$ represents a divalent hydrocarbon radical, optionally containing urethane, ester and/or ether groups, in which different radicals $R^1$ can be present at the same time if several radicals $R^1$ are present in the same molecule, and m represents a whole or (on average) fractional numbers from 1 to 10, b) sulphonate dioles of the general formula

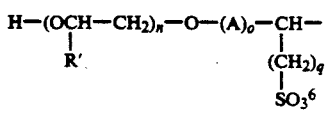

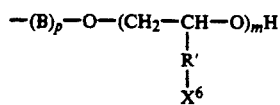

in which

A and B represent identical or different divalent aliphatic hydrocarbon radicals having 1 to 6 carbon atoms, R' represents hydrogen, an aliphatic hydrocarbon radical having 1 to 4 carbon atoms or a phenyl radical, $X^\ominus$ represents an alkali metal cation or a substituted or unsubstituted ammonium group, n and m represent identical or different numbers from 0 to 30, o and p each represents 0 or 1, and q represents an integer from 0 to 2, and c) appropriate auxiliaries and additives which polyurethane at least partially contains incorporated acylurea groups of the formula

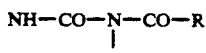

in which R denotes an organic radical, preferably a saturated or unsaturated aliphatic hydrocarbon radical having 1-35 C atoms, an aryl radical having 6-10 C atoms or an araliphatic radical having 7-10 C atoms, in which different radicals R can be present, if several radicals R are present side by side in the same molecule, and subjecting the resulting emulsion to a polymerization initiated by free radicals.

2. Emulsion polymers according to claim 1, obtained by preparing the aqueous solution or dispersion of the anionically modified polyurethane which is used as the emulsifier by reaction of a3) polyisocyanates containing acylurea groups of the formula

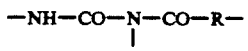

in which R has the meaning given in claim 1 with b), and if appropriate with the use of c) and conversion of the polyisocyanate addition product obtained into an aqueous solution or dispersion during or following the polyaddition reaction, in which those structural components b are used which have sulphonate groups and, if appropriate, with the use of structural components a) and/or b) which have ethyleneoxy units within a polyether chain, in which the total amount of these hydrophilic structural components is such that an amount of anionic groups, and, if appropriate, of ethylene oxide groups of the type mentioned, which guarantees water solubility or dispersibility, is present in the polyisocyanate polyaddition product.

3. Emulsion polymers according to claim 1, obtained by carrying out the polymerization of the mixtures of monomers from A) and B) in the presence of 5 to 50% by weight, relative to the mixture of monomers, of the anionically modified polyurethane.

4. Emulsion polymers according to claim 1, characterized in that the emulsion polymerization is carried out in the presence of an oligomeric nonionic and/or low-molecular-weight anionic auxiliary emulsifier, relative to the anionically modified polyurethane.

5. Polymers according to claim 1, obtained by using A) at least one monomer from the series consisting of acrylonitrile, vinyl acetate, methacrylonitrile and B) at least one (meth)acrylic ester having 1-12 C atoms in the alcohol radical, such as ethyl acrylate, methyl methacrylate, n-butyl acrylate, i-butyl acrylate, 2-ethylhexyl acrylate, 3-hydroxypropyl methacrylate.

6. Polymers according to claim 1, obtained by using a mixture of monomers from 20 to 80% by weight of A) and 80 to 20% by weight of B).

7. An emulsion polymer according to claims 1 wherein the A) component is a monomer selected from the group consisting of substituted styrene and substituted vinylcarboxylates.

8. An emulsion polymer according to claim 1 wherein the solution or dispersion of a anionically modified polyurethane contains —$SO_3^-Me^+$ and/or —$COO^-Me^+$ groups ($Me^+$=cation, selected from the group consisting of $H^+$, $Na^+$, $K^+$, $Li^+$, $NH_4^+$ or a substituted ammonium ion.

9. An emulsion polymer according to claim 2 wherein the total amount of hydrophilic structural components a) and b) which have ethyleneoxy units within the polyether chain is 2 to 300 milliequivalents per 100 g of solid.

10. An emulsion polymer according to claim 2 wherein the ethylene oxide groups are present in an amount of 0 to 25% by weight.

11. An emulsion polymer according to claim 3 wherein R denotes a saturated or unsaturated aliphatic hydrocarbon radical having 1-35 C atoms, an aryl radical having 6-10 C atoms or an araliphatic radical having 7-10 C atoms.

12. An emulsion polymer according to claim 4 wherein the anionically modified polyurethane is present in an amount of 7.5 to 30% by weight.

13. An emulsion polymer according to claim 5 wherein the emulsion polymerization is carried out in the presence of 1-40% by weight of auxiliary emulsifier.

14. A polymer according to claim 6 wherein component A) is present in an amount of 30 to 70% by weight and component B) is present in an amount of 70 to 30% by weight.

* * * * *